United States Patent [19]
Benoist et al.

[11] Patent Number: 5,645,398
[45] Date of Patent: Jul. 8, 1997

[54] UNSECTORED, ONE PIECE DISTRIBUTOR OF A TURBOJET TURBINE STATOR

[75] Inventors: Josette Benoist, Le Mee S/Seine; Paul Martyez, Montgeron; Jean-Claude Christian Taillant, Vaux Le Penil, all of France

[73] Assignee: Societe Nationale D'Etude Et De Construction De Moteurs D'Aviation "Snecma", Paris, France

[21] Appl. No.: 562,597

[22] Filed: Nov. 24, 1995

[30]     Foreign Application Priority Data

Dec. 7, 1994 [FR] France .................. 94 14692

[51] Int. Cl.⁶ .................................................. F01D 25/26
[52] U.S. Cl. .................................. 415/134; 415/135
[58] Field of Search ............................ 415/135, 134, 415/136, 137, 138, 139, 209.2, 209.3

[56]             References Cited

U.S. PATENT DOCUMENTS

| | | | |
|---|---|---|---|
| 3,860,359 | 1/1975 | De Feo | 415/209.2 |
| 4,314,793 | 2/1982 | DeTolla et al. | 415/135 |
| 4,379,560 | 4/1983 | Bakken | 415/135 |
| 4,863,342 | 9/1989 | Norstrom et al. | 415/134 |
| 5,333,995 | 8/1994 | Jacobs et al. | 415/209.3 |

*Primary Examiner*—John T. Kwon
*Attorney, Agent, or Firm*—Oblon, Spivak, McClelland, Maier & Neustadt, P.C.

[57]             ABSTRACT

While remaining in one piece and unsectored, a nozzle permits a slight radial expansion of an assembly. The nozzle is formed by an inner platform mounted in a sliding manner with respect to a stator and an outer platform mounted in a free manner with respect to the case of the stator. Rods are fitted in a pivoting manner so as to radially guide and axially block upper parts of vanes, which are mounted in a sliding manner in the inner platform. The assembly is advantageously completed by gaskets. The nozzle can be used in high pressure turbines of turbojets.

4 Claims, 3 Drawing Sheets

UNSECTORED, ONE PIECE DISTRIBUTOR OF A TURBOJET TURBINE STATOR

FIELD OF THE INVENTION

The invention relates to a high pressure or fan jet turbine of a turbine engine, such as the turbojets used on aircraft. It more specifically relates to the one piece structure of the nozzle of the said high pressure turbine stator.

PRIOR ART AND SET PROBLEM

Existing or future turbine engines such as the turbojets equipping civil and military aircraft are at present the object of research aimed at improving the performance and maintenance characteristics thereof. The consequences of these improvements are a reduction in fuel consumption and maintenance costs for the engine, no matter whether it is beneath the aircraft wing or in the servicing shop. The taking into account of these objectives makes it necessary for aircraft manufacturers to reconsider the definition of some or all the parts of such turbine engines.

With respect to FIG. 1 and the high pressure turbine 1 of the turbine engine, the stator nozzle is formed in most cases by sectors constituted by several vanes connected by platforms. Therefore sectors are frequency encountered formed by two vanes connected by an inner platform and an outer platform, said sectors then being fixed to circular ferrules in order to form the nozzle.

It is obvious that the approach and connection zones of these sectors create geometrical imperfections in the assembly of the nozzle and disturb the flow of air through the high pressure turbine. These imperfections allow leaks to exist, which are prejudicial to the efficiency of the turbine engine.

An object of the invention is to obviate these disadvantages by providing an as smooth as possible aerodynamic stream and by reducing to the greatest possible extent the engine air flow leaks so as to improve performance.

It is also envisaged to use dismountable nozzle blades in order to reduce repair costs.

U.S. Pat. No. 4,643,636 discloses a turbine nozzle, whose inner and outer platforms are circular and in one piece.

SUMMARY OF THE INVENTION

Therefore the main object of the invention is an unsectored, one piece nozzle of a turbine engine turbine stator having a longitudinal axis, comprising vanes extending radially with respect to the turbine engine axis, an inner platform with respect to which are axially fixed the vanes by a first end and an outer platform to which are fixed the vanes by a second end and means for fixing in rotation and axial fixing means, as well as flexible means for the radial fixing of the nozzle to permit a slight radial expansion of the vanes and the two platforms.

According to the invention, the vanes are fitted so as to slide radially in the inner platform, which is itself fixed to the stator hub, and the flexible radial fixing means, means for fixing in rotation and axial fixing means are provided by a rod mounted in pivoting manner on the outer platform by a first end and mounted in pivoting manner on the case by a second end.

The nozzle is completed by a flange fixed to the outer surface of the outer platform and a clevis fixed to the first end of the rod.

The axial fixing means are completed by a downstream wall of the combustion chamber on which the inner platform is fixed and by a radial wall of the abradable carrying part of the stator, the inner platform being mounted so as to slide radially in the slit formed by these two parts.

The sliding of the vanes in the inner platform is preferably ensured by a slit made on the outer surface of the inner platform and in which the corresponding vane can slide.

BRIEF DESCRIPTION OF THE DRAWINGS

The invention and its various characteristics will be better understood from reading the following description with reference to the attached drawings, wherein.

DETAILED DESCRIPTION OF AN EMBODIMENT

Figure 1:
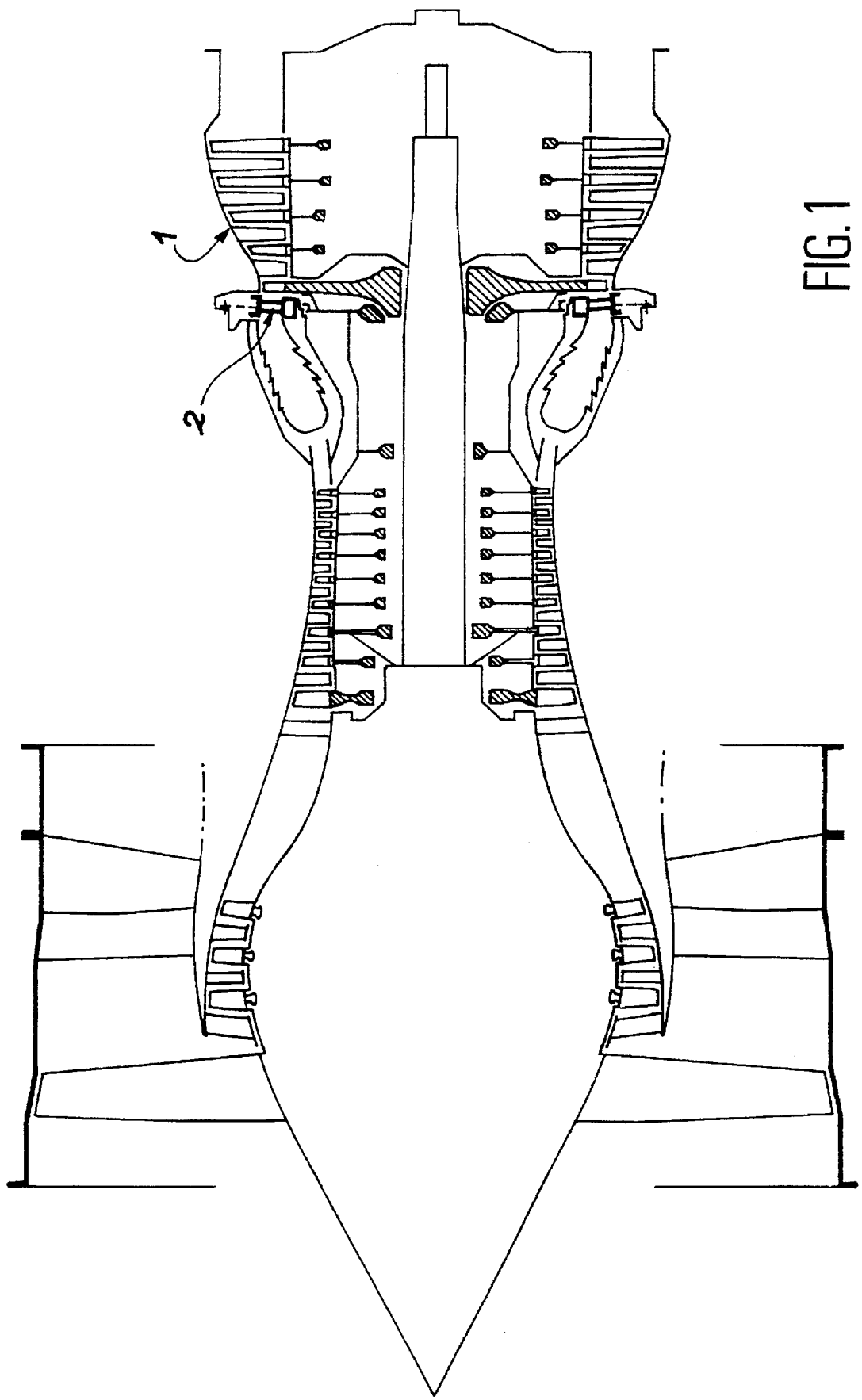
FIG. 1 shows, in longitudinal section, a turbine engine using the nozzle according to the invention.
Figure 2:
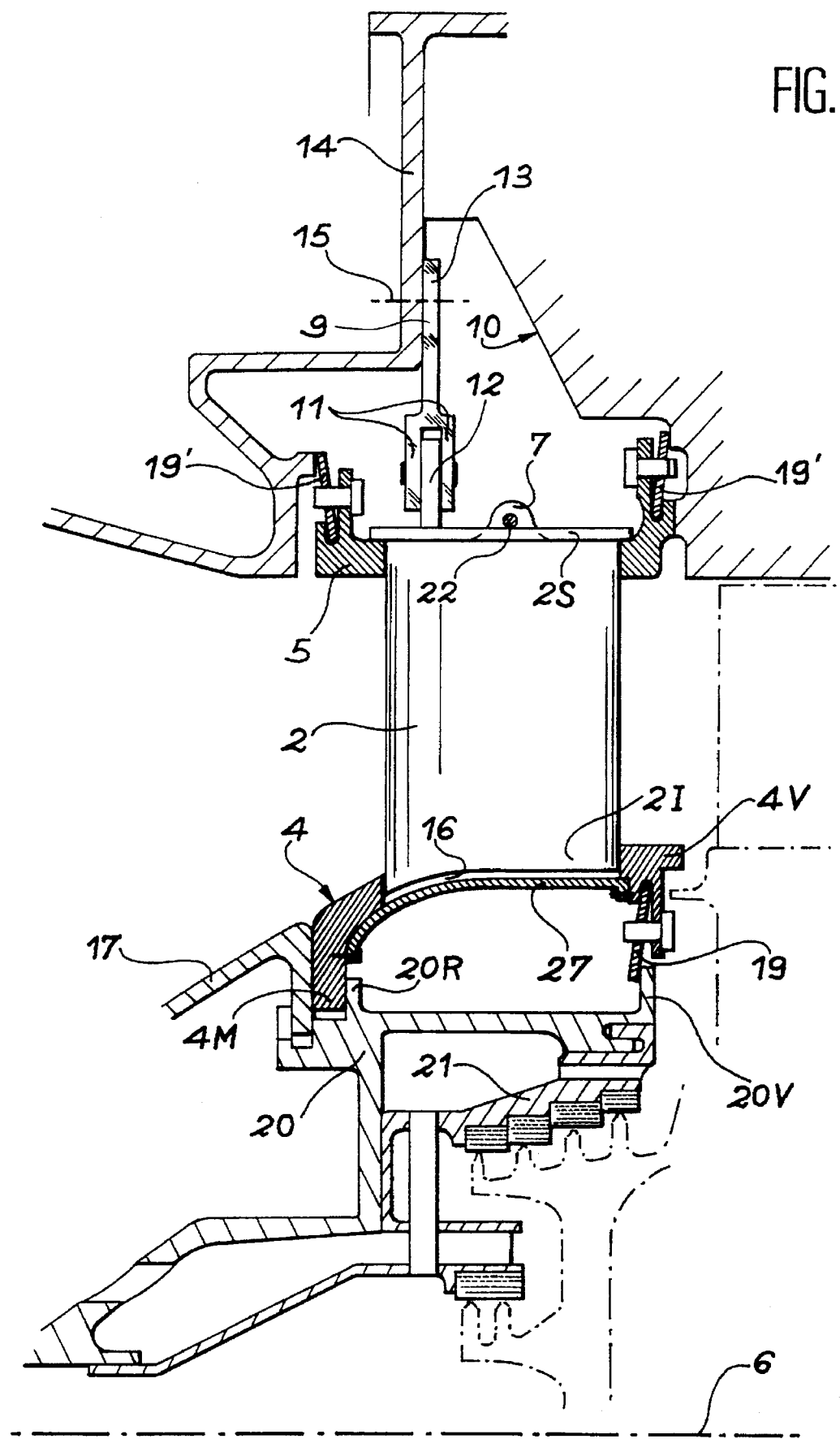
FIG. 2 shows, in longitudinal section, the nozzle according to the invention.

With reference to FIG. 2, it can be seen that the vanes 2 are fitted between the outer part 10 of the stator and its central hub 20. For this positioning use is made of an inner platform 4 and an outer platform 5. Thus, the vanes 2 are axially positioned with respect to the longitudinal axis 6 of the turbine engine, radially with respect to said same axis and are also maintained in rotation about said axis.

It should be noted that the inner 4 and outer 5 platforms are in each case constituted by a single ferrule made in one piece. The inner platform 4 is axially fixed by its upstream side 4M, which bears against the downstream wall of the combustion chamber 17. The upstream side 4M is jammed between the downstream wall of the combustion chamber 17 and a raised surface or step 20R outside the stator hub 20. Thus, the inner platform 4, during the different expansions of the nozzle, can slide radially with respect to said two fixed parts. The downstream side 4V of the inner platform 4 is not fixed. However, it supports a gasket 19, which also bears on the downstream part 20V of the hub 20.

The inner platform 4 is completed in its center by a thin sheet 27, which is fixed both to the upstream side 4M and to the downstream side 4V.

The thickness difference between the thin sheet 17 and the upstream 4M and downstream 4V sides means that the inner platform 4 has a slit 16 in which can radially slide by its inner end 21 the vane 2. It is pointed out that the stator hub 20 supports at the height of the nozzle according to the invention the abradable carrying part 21.

The outer ends 2S of the vanes are mounted in fixed manner on the outer platform 5. These outer ends 2S also form a radial positioning abutment with respect to said outer platform 5. They are fixed by means of bosses 7, which are pierced so as to permit the introduction into the same of a spindle 22 linking the vane 2 to the outer platform 5, which has two not shown, pierced flanges or bosses aligned with the vane boss 7.

Figure 3:
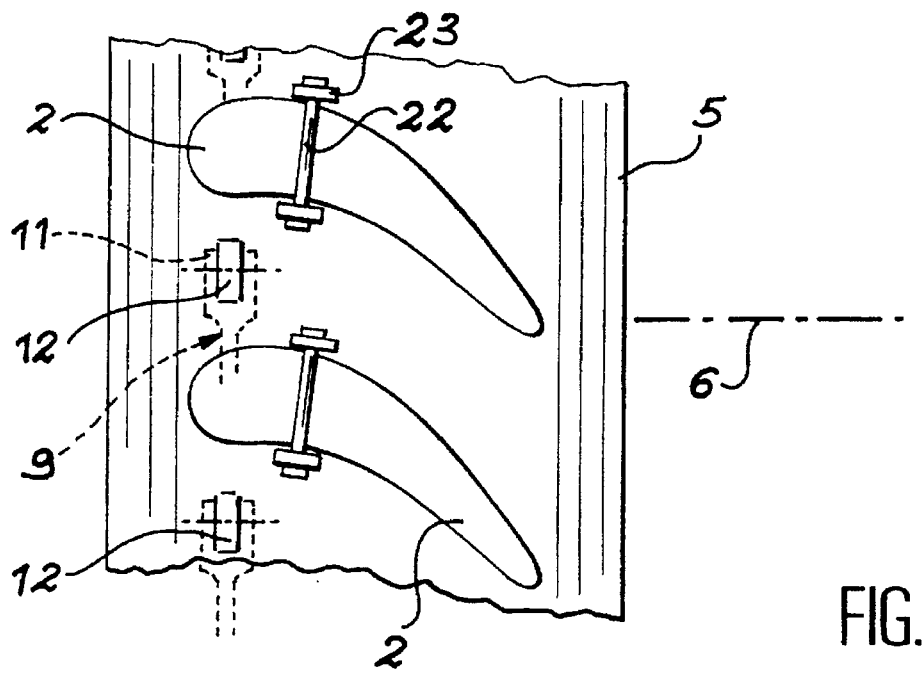
FIG. 3 shows, in plan view, two vanes of the nozzle according to the invention.

FIG. 3 makes it possible to more easily see this fixture. FIG. 3 is a plan view at the bosses 7 of the vanes 2. It is possible to see for each vane a spindle 22 traversing the vane 2 and passing through two lateral bosses 23 integral with the outer platform 5. The orientation of this fixture is inclined, but this only constitutes an embodiment.

The axial positioning and the fixing in rotation of the vanes 2 around the axis 6 are brought about by means of a series of rods 9 mounted in pivoting manner with respect to the case 14 of the stator 10 and with respect to the outer platform 5. More specifically, each rod 9 has a first lower end in the form of two half-clevises 11. The latter are placed around a flange 12 integral with the upper end 2S of the vane 2, a spindle being introduced into the said assembly. Thus, each rod 9 is mounted so as to pivot about an axis parallel to the longitudinal axis 6 of the turbine engine.

As shown in FIG. 2, at its end 13, each rod 9 is also mounted in pivoting manner about another axis 15 parallel to the longitudinal axis of the turbine engine by a pivoting link, which is schematically shown in the drawing by the pivoting axis 15.

Thus, each vane can move radially slightly, taking account of the expansions due to the operational temperature differences of the turbine engine. Obviously, the outer platform 5, which is fixed to the vane 2, undergoes the same radial movements with respect to the longitudinal axis 6. Thus, it is not fixed relative to the stator 10, but is equipped upstream and downstream with a flat annular joint 19, which in each case bear against a junction surface of the stator 10.

FIG. 3 also shows the location of the flanges 12 with respect to the vanes 2, about the longitudinal axis 6 of the turbine engine. Thus, each flange 12 is placed between two vanes 2 and more particularly between the two ends 2S of each vane shown in FIG. 2.

Figure 4:
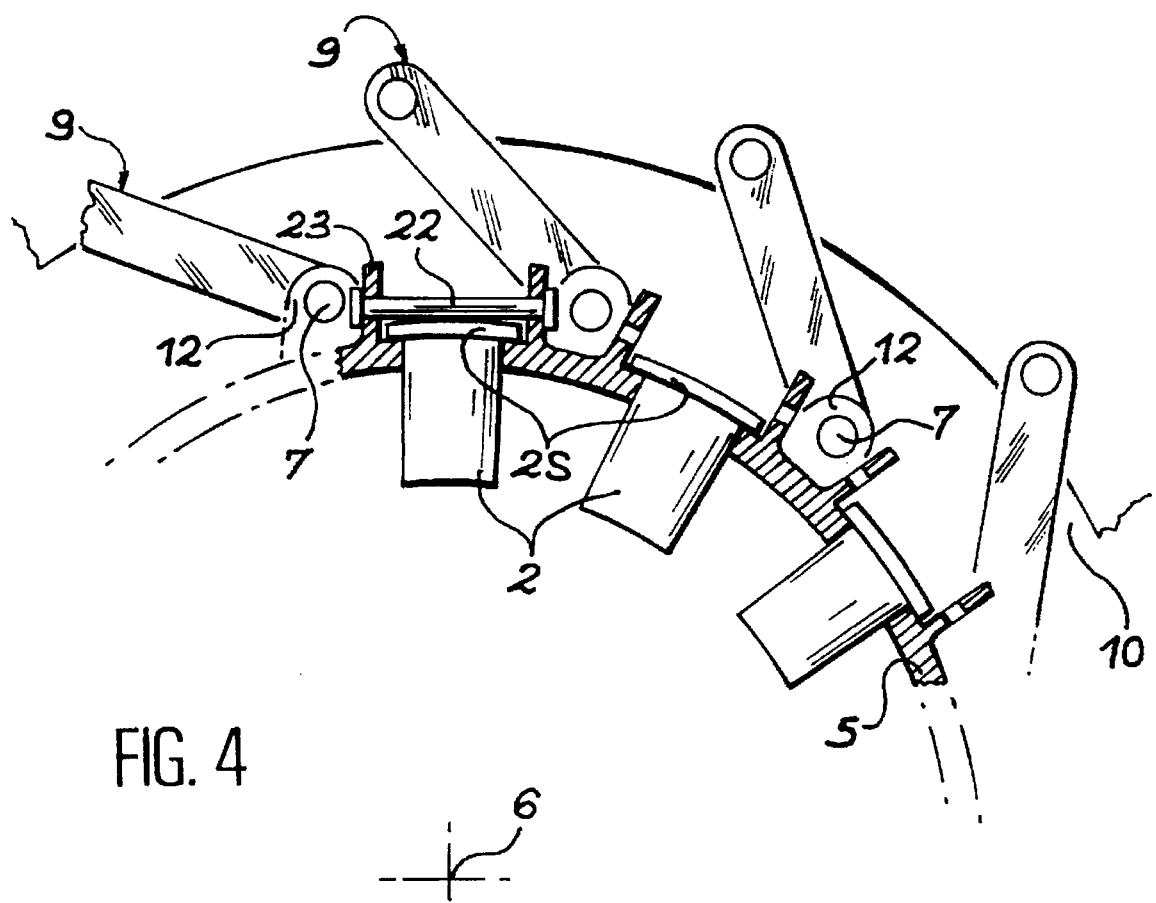
FIG. 4 shows, a partial front view of the nozzle according to the invention.

FIG. 4 clearly shows this displacement of the flanges 12 and the rods 9 with respect to the end 2S of each vane 2. FIG. 4 also shows the fixing of its upper ends 2S relative to the stator 10 and in particular by means of the spindle 22, the bosses 7 and the perforated flanges 23.

Thus, a slight expansion of the nozzle assembly is allowed, the rods 9 guiding the outer platform 5 of the nozzle in the radial direction, while retaining it axially.

This non sectorization of the high pressure turbine nozzle in a turbojet obtained by one piece inner and outer platforms leads to a smoother fluid stream and consequently the turbojet performance characteristics are improved. Gas flow leaks are also reduced, which also leads to improvements in the turbojet performance characteristics.

The fact that the vanes can be dismantled optimizes the repair costs for such a turbojet.

We claim:

1. An unsectored one piece nozzle of a turbine engine stator having a longitudinal axis comprising:

vanes which radially extend about the longitudinal axis;

an inner platform to which a first inner end of the vanes are axially fixed;

an outer platform to which a second outer end of the vanes are fixed; and means for fixing the nozzle so as to permit a radial expansion of the vanes and the inner and outer platforms;

wherein:

the vanes are mounted so as to radially slide in the inner platform which is fixed with respect to a hub of a stator; and the fixing means comprise rods, each of the rods having a first end and a second end, the first end of each of the rods being fitted in a pivoting manner to said outer platform, and the second end of each of the rods being fitted in a pivoting manner to a case of the stator.

2. A nozzle according to claim 5, wherein the nozzle comprises, for each rod, a flange fixed to an outer surface of the outer platform and the first end of each rod comprises two half-clevises.

3. A nozzle according to claim 5, wherein the fixing means comprises a downstream wall of a combustion chamber on which the inner platform bears and a radial wall of the stator hub, the inner platform being mounted so as to slide radially in a slit constituted by said downstream wall of the combustion chamber and the radial wall of the stator hub.

4. A nozzle according to claim 3, wherein the inner platform comprises further slits which allow each vane to slide radially at its inner end.

* * * * *